(12) United States Patent
Leung et al.

(10) Patent No.: US 6,218,043 B1
(45) Date of Patent: Apr. 17, 2001

(54) DUAL VOLTAGE MULTIPLE CONFIGURATION BATTERY AND ADAPTER

(75) Inventors: Fee Chan Leung, Hazlet; Mary A. Hendrickson, Forked River, both of NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/175,550

(22) Filed: Oct. 20, 1998

(51) Int. Cl.$^7$ .................................................. H01M 2/10
(52) U.S. Cl. ......................... 429/99; 429/100; 429/158; 429/149
(58) Field of Search ............................... 429/99, 100, 97, 429/96, 163, 176, 186, 158, 159, 149

(56) References Cited

U.S. PATENT DOCUMENTS

| | | | |
|---|---|---|---|
| 4,957,829 | * 9/1990 | Holl | 429/99 |
| 5,744,260 | * 4/1998 | Sim | 429/99 |
| 5,853,915 | * 12/1998 | Suto | 429/99 |
| 5,874,181 | * 2/1999 | Tam | 429/1 |
| 6,023,146 | * 2/2000 | Casale et al. | 320/112 |

* cited by examiner

Primary Examiner—Carol Chaney
Assistant Examiner—R Alejandro
(74) Attorney, Agent, or Firm—Michael Zelenka; John M. O'Meara

(57) ABSTRACT

The battery has two legs of equal voltage (expressed as Volts DC or VDC) and equal electrochemical capacity (expressed as Ampere-Hours or AH). Each leg has one or more hinged and electrically connected modules. Both legs are hinged to each other but are not electrically connected. The modules of the battery can be folded into four basic prismatic shapes and an infinite number of non-prismatic shapes. Each shape is basically two batteries because the equal voltage legs can be connected to the load equipment in electrical series or electrical parallel. An adapter can be connected to the battery to provide additional battery footprints.

1 Claim, 3 Drawing Sheets

DUAL VOLTAGE MULTIPLE CONFIGURATION BATTERY AND ADAPTER

GOVERNMENT INTEREST

The invention described herein may be manufactured, used and licensed by or for the Government of the United States of America without the payment by the Government of any royalties thereon.

BACKGROUND OF THE INVENTION

1. Field of the Invention

The invention is related to the field of electrochemical engineering, and in particular, to dual voltage, multiple configuration batteries.

2. Description of the Background Art

Two requirements must be met before a battery can be used to provide power to an electrical device.

First, the voltage of the battery must match the voltage required by the device. For example, a device that needs 10 volts to operate will use a 10 volt battery. This requirement is straightforward and simple.

Second, the shape of a battery must match a device's battery footprint before it can be used to provide power to that device. This second requirement is more difficult to meet. This requirement is a problem because different electrical devices have different battery footprints. Thus, in order for a 10 volt battery to be used in a device that requires 10 volts, the shape of that battery must match the device's battery footprint.

As a result, batteries of equal voltage are currently manufactured in different shapes and configurations in order to meet this second requirement. This is known in the art as a proliferation of different battery shapes. This proliferation of battery shapes is a problem because battery vendors have a difficult time supplying the various battery shapes that are needed to power the devices that are in the marketplace. For example, in order to manufacture every different battery shape that is required by equipment manufacturers, vendors have to set up a separate production line for each shape.

Also, battery shape proliferation hurts consumers. Currently, consumers have to purchase and store batteries that have equal voltages but different shapes. These purchases are relatively low volume purchases, which results in a higher unit price for an individual battery. This proliferation also increases the logistics involved in supplying each device with a specific battery that is shaped to match that device's battery footprint.

The problems that vendors and consumers are having because of battery shape proliferation show a strong need to alleviate this proliferation of battery shapes.

Currently, there is a method of partially alleviating the proliferation of battery shapes. This is done by using the smallest individual modules or cells of a battery to create "multiple configuration batteries." Consumers attach the small modules or cells in series and/or parallel electrical configurations to form many different shapes of batteries. Thus, the shape of a battery can be configured to match the battery footprint of an electrical device.

Logistically, this approach is very sound because vendors and consumers only have to stock a small family of common modules and cells. Since each module and cell is used in many types of battery configurations, each module and cell can be purchased by consumers in large quantities, then combined to form batteries of various shapes. This provides consumers with the ability to make large volume purchases of a common item at a low unit price.

However, in the field, attempts to use modules and cells as building blocks to create various shaped batteries is not so simple. Groups of partially used modules or cells from one device can not be intermingled with modules or cells used in another device. The reason for this is that one set of modules or cells may have been discharged by 50 percent and the other set of modules or cells may have been discharged by 75 percent. Accidentally mixing these two modules or cells to form batteries creates reliability and safety problems for the user.

Thus, in addition to alleviating battery shape proliferation, there is a strong need to eliminate the safety problems found in previous multiple configuration batteries.

The present invention meets these needs by using a design that enables multiple configuration batteries to be mass produced and to fit into many different battery footprints and battery boxes. Therefore, an advantage of the present invention is that it alleviates proliferation of battery shapes.

The design of the present invention eliminates the safety problems of previous multiple configuration batteries. Thus, another advantage of the present invention is providing multiple configuration batteries that are safer to use.

There are several additional advantages of the present invention. The battery design of the present invention has pertinent applications in the military, such as simplifying field logistics, lowering battery purchase costs and supplying power to electrical devices having various shapes and sizes of battery footprints.

Also, the present invention can be used by commercial battery vendors to simplify their production lines. Vendors can simply assemble one battery based on the design of the present invention. This design can then be reconfigured by consumers into several different shapes and voltages, so that the shape of the battery will match the battery footprint used by any given electrical device.

SUMMARY OF THE INVENTION

The present invention is a multiple configuration battery that eliminates the safety problems of previous multiple configuration batteries. The invention solves the problems of battery proliferation and unsafe multiple configuration batteries by physically hinging all of the reconfigureable modules and cells together. The cells are physically attached to each other. The modules of each cell are electrically and physically connected to each other. The cells can then be connected to the electrical device in electrical series or electrical parallel.

Therefore, all components of the battery are discharged simultaneously. This eliminates the accidental mingling that occurs in previous modular/cell design schemes, thus increasing the safety to the user of the battery, while providing a multiple configuration battery that is shaped to match the battery footprint of the electrical device. The multiple configuration battery can be configured to fit into four basic prismatic shapes of battery footprints, where each shape has two voltages. Therefore, one multiple configuration battery provides eight different batteries.

In another embodiment of the invention, an adapter can snap on to a dual voltage multiple configuration battery. The adapter and multiple configuration battery form an assembly that is electrically and physically equal to a conventional prismatic shaped battery, and matches the conventional battery's design requirements. The assembly of the present invention thus allows the present invention to replace the conventional batteries used in existing devices.

The assembly of the present invention is also more flexible for future applications than conventional batteries. When the adapter is removed, the dual voltage multiple configuration battery can form an additional four shapes, each having two different voltages. Thus, the battery and adapter assembly alleviates battery shape proliferation because it replaces one battery with a battery assembly that can form nine distinct batteries.

DETAILED DESCRIPTION OF THE INVENTION

The battery has two cells of equal voltage (expressed as Volts DC or VDC) and equal electrochemical capacity (expressed as Ampere-Hours or AH). Each cell has one or more hinged and electrically connected modules. Both cells are hinged to each other but are not electrically connected. The modules of the battery can be folded into four basic prismatic shapes and an infinite number of non-prismatic shapes. Each shape can create two batteries, depending on whether the equal voltage legs are connected to the load equipment in electrical series or electrical parallel.

Figure 1A:
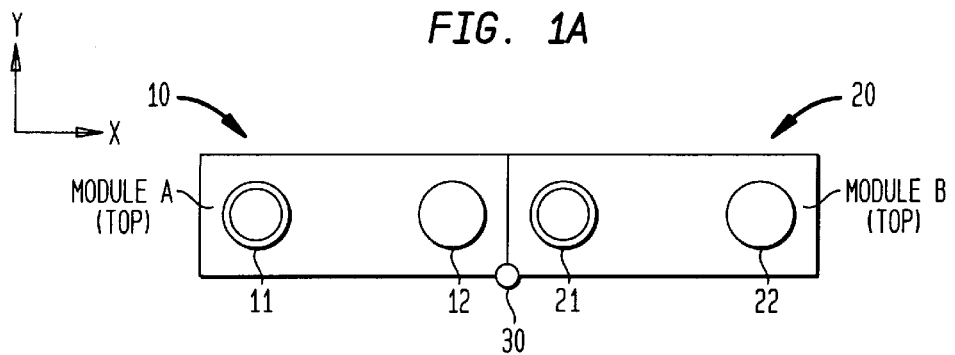
FIG. 1A shows a top view of the battery.
Figure 1B:
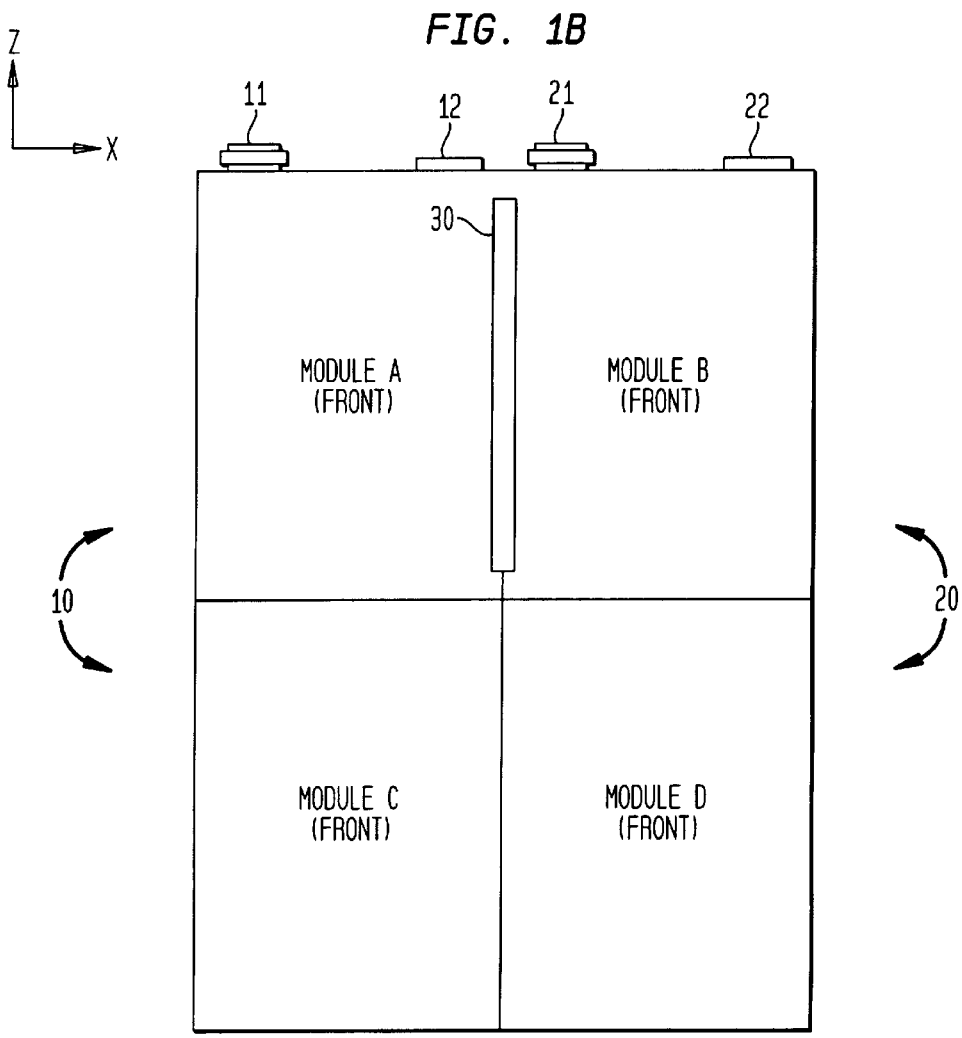
FIG. 1B shows a front view of the battery in the flat configuration.

With reference to FIGS. 1A and 1B, the battery has two legs 10, 20. A hinge 30, located along the z axis, mechanically connects leg 10 with leg 20 so that these two legs can be rotated relative to each other along the axis of hinge 30 (z axis). The rotation permitted by hinge 30 allows cell 10 and cell 20 to fold their front faces together, and to unfold their faces back to the original flat configuration of FIGS. 1A and 1B. The top of leg 10 has a positive terminal 11 and a negative terminal 12. The top of leg 20 has a positive terminal 21 and a negative terminal 22.

Each leg includes one or more modules. For example, in FIG. 2B, leg 10 has two modules, Module A and Module C. These modules are hinged together by Hinge 40, which is located along the x axis. Hinge 40 electrically connects Module A and Module C in series to form voltage $V_{ac}$, which is the sum of the voltages of modules A and C. This voltage $V_{ac}$ is the voltage of cell 10. Hinge 40 also mechanically connects Module A with Module C. Hinge 40 allows Modules A and C to rotate relative to each other along the axis of hinge 40 (the x axis of FIG. 2B). The rotation permitted by hinge 40 allows Modules A and C to fold their rear faces together, and to unfold their faces back to the original flat configuration of FIG. 2B.

Figure 2A:
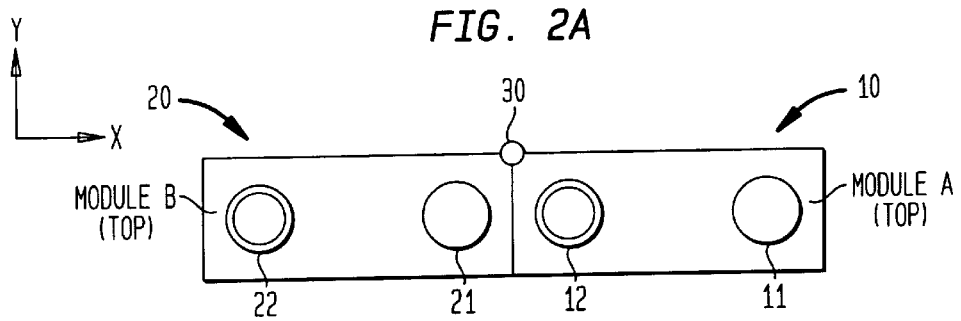
FIG. 2A shows a top view of the battery.
Figure 2B:
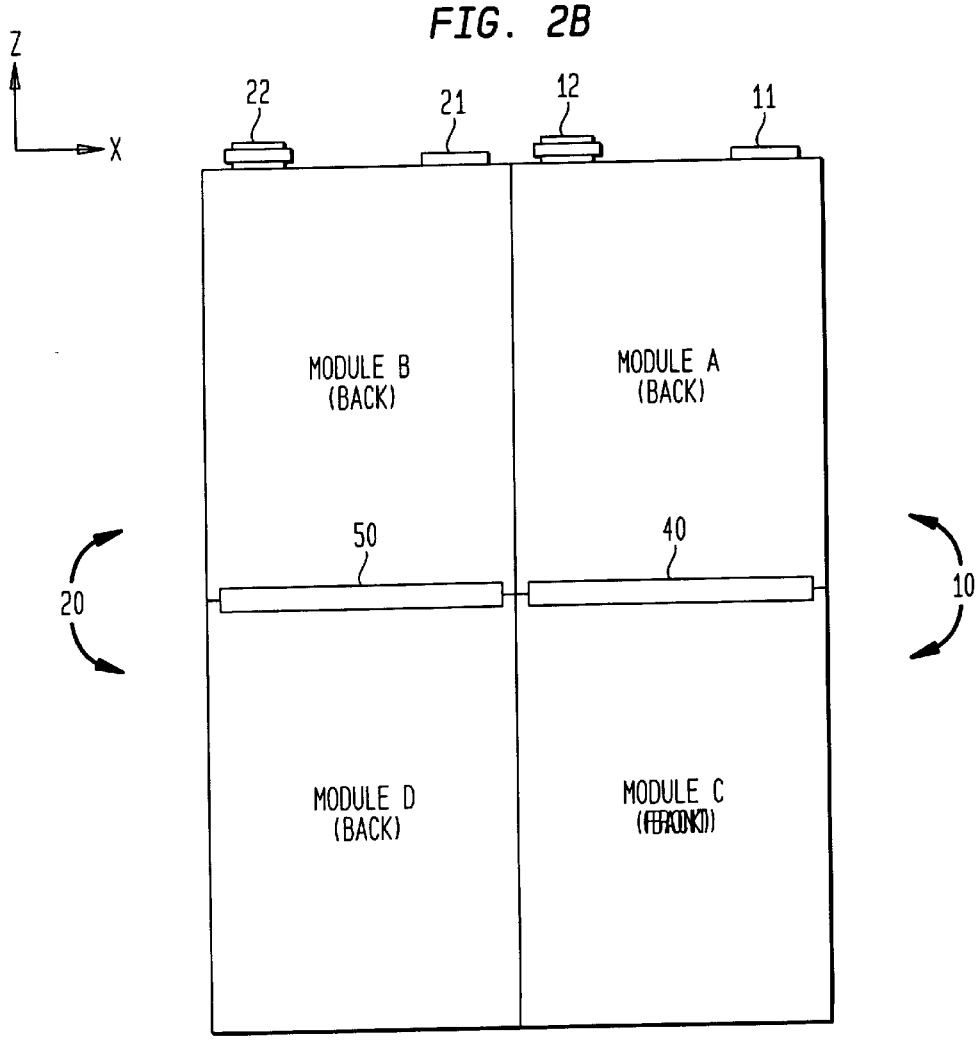
FIG. 2B shows a back view of the battery in the flat configuration.

Module B and Module D are connected by hinge 50, as shown in FIG. 2B. Hinge 50 electrically connects Module B and Module D in series to form voltage $V_{bd}$. This voltage $V_{bd}$ is the voltage of cell 20. Modules B and D rotate relative to each other along the axis of hinge 50, which is the x axis. The rotation permitted by hinge 50 allows Modules B and D to fold their rear faces together and to unfold their faces back to the original flat configuration.

The multiple configuration battery design can form the following prismatic shapes:

Shape 1 is the Flat Configuration. All of the modules are unfolded.

Shape 2 is the One Fold Configuration. Cell 10's front face is folded onto cell 20's front face using hinge 30. Thus, the front of cell 10 is rotated along the z axis relative to the front of cell 20, so that the front of cell 10 is flush with the front of cell 20.

Shape 3 is the Two Fold Configuration. Module D's rear face is folded flush with Module B's rear face using Hinge 50. Module C's rear face is folded flush with Module A's rear face using Hinge 40.

Shape 4 is the Three Fold Configuration. This shape is a combination of the One Fold Configuration and the Two Fold Configuration. Cell 10's front face is folded flush with cell 20's front face using hinge 30. Module D's rear face is folded flush with Module D's rear face using hinge 50. Module C's rear face is folded flush with Module A's rear face using hinge 40.

These four different configurations can be used to form eight different batteries, because each shape can have two different voltages. The equal voltage cells 10 and 20 can be connected to the load in series or parallel, thus forming two batteries for each shape.

When in the flat configuration and two-fold configuration, cells 10 and 20 can be rotated along hinge 30 by any amount, to form an infinite number of V-shaped configurations.

Each of the five configurations (four prismatic and infinite V shapes) can be used in either the $V_{ac}+V_{bd}$ volt mode or the $V_{ac}$ in parallel with $V_{bd}$ volt mode by the electric equipment.

Figure 3A:
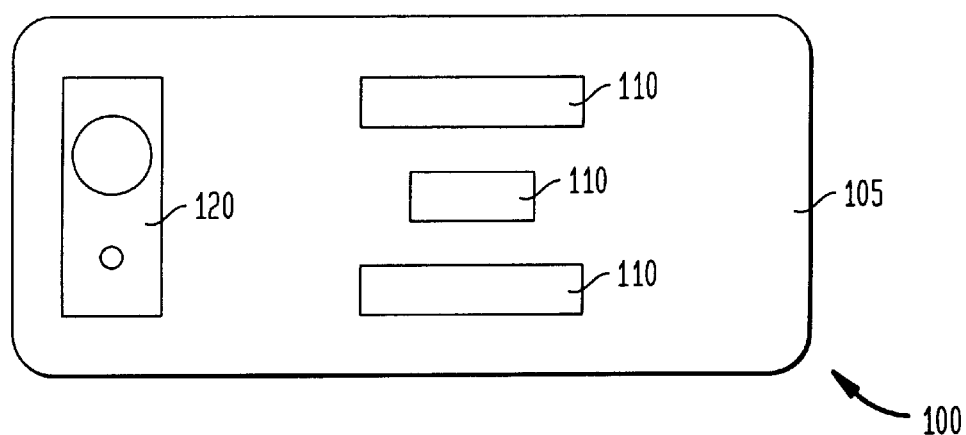
FIGS. 3A and 3B show the adapter for the battery.
Figure 3B:
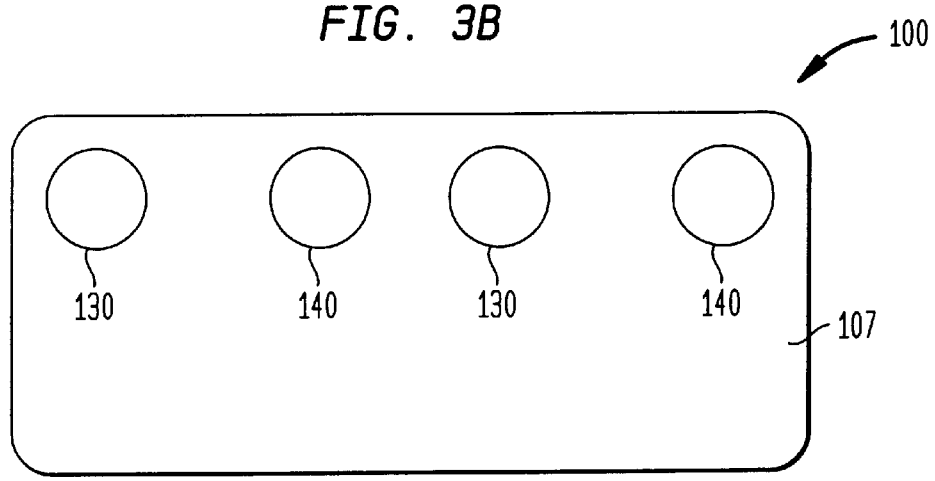

In a further embodiment of the invention, the multiple configuration battery is provided with an adapter that will permit the battery to fit into a battery footprint that does not match one of the four basic prismatic shapes. The adapter is shown in FIGS. 3A and 3B. This adapter permits the multiple configuration battery to be used by organizations that have specific battery design requirements. One such organization is the United States Army.

For example, the Army's policy requires equipment developers to use one of five battery configurations: BA-X390/U, BA-X588/U, BA-X847/U, BA-X372/U and BA-X567/U batteries. The policy aims to keep the battery logistics simple for the soldier by preventing proliferation of battery shapes when new equipment is developed. Unfortunately, the five basic Army battery configurations can not meet all of a developer's desires. The prismatic shaped Army batteries (BA-X590/U, BA-X588/U and BA-X847/U) can be replaced with a properly dimensioned dual voltage multiple configuration battery that uses an adapter to make the multiple configuration battery and adapter assembly electrically and physically equal to one of the original prismatic shaped batteries. Under this concept, the Army logistical system will stock only five part numbers, but a developer can choose from 27 distinct prismatic batteries, plus the BA-X372/U and BA-X567/U.

For example, the adapter 100 shown in FIGS. 3A and 3B can snap on to a multiple configuration battery in the two-fold configuration. The adapter has flat contacts 110 and female sockets 120, located at the top 105 of the adapter, as shown in FIG. 3A, which match the desired battery footprint of an electronic device. The adapter also has positive terminals 130 and negative terminals 140 located on the bottom 107 of adapter 100, for attaching the adapter to the battery.

In this embodiment, the adapter and multiple configuration battery form a battery assembly that is electrically and dimensionally equal to a BA-X847/U type battery. This assembly can be used to power existing devices that use the BA-X847/U batteries. This is only one example. The adapter 100 can be shaped so that the multiple configuration battery with the adapter is physically and electrically equal to any prismatic shaped battery. Adapters similar to adapter 100 can be designed to snap on to properly dimensioned multiple configuration batteries to form assemblies that are electrically and dimensionally equal to existing prismatic batteries. This increases the marketability and usefulness of the manufacturer's batteries, because the batteries can be used in many more equipment applications.

The adapter 100 is removable. When the adapter is removed, the multiple configuration battery can form four prismatic shapes, as discussed above. The two cells can be connected in either electrical series or electrical parallel, providing two voltages for each shape. For example, if each cell has 6 volts, each of the four prismatic shapes can provide either 6 volts or 12 volts to the device. Thus, the multiple configuration battery with adapter assembly can form nine distinct batteries. This greatly increases the design choices for developers working on future devices.

What is claimed is:

1. A triple folding, multiple configuration battery, comprising:

a first voltage cell having a first module with a first voltage and a second module with a second voltage, said first and second modules being connected for rotation relative to each other about a first axis;

a second voltage cell having a third module with a third voltage and a fourth module with a fourth voltage, said third and fourth modules being connected for rotation relative to each other about said first axis; and said first and second voltage cells being connected for rotation relative to each other about a second axis which is perpendicular to said first axis;

said first and second voltage cells as well as said first and second modules, and said third and fourth modules being foldable upon each other to form a three fold configuration.

* * * * *